HYDROGEN MANUFACTURE

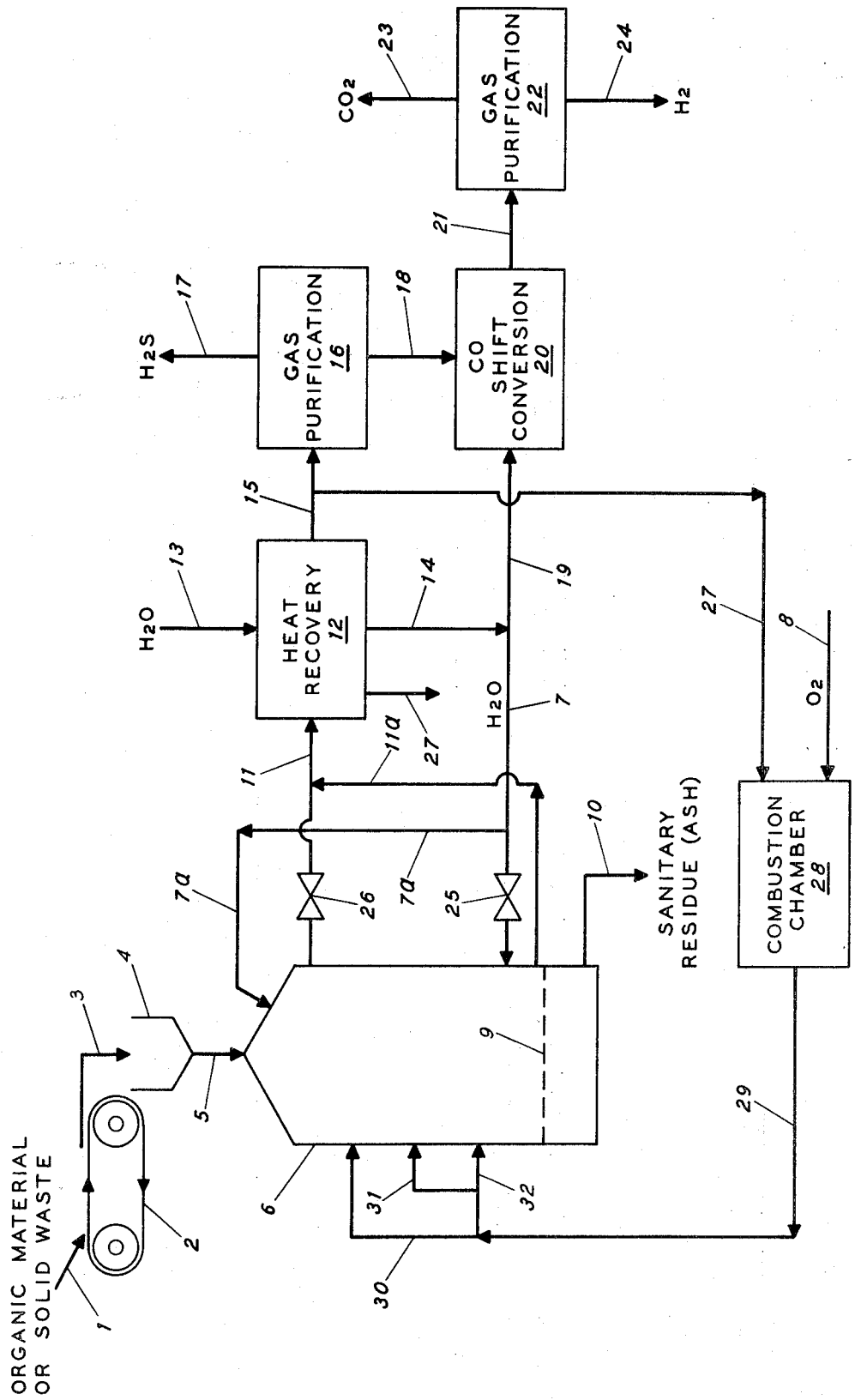

Robert J. White, Pinole, Calif., assignor to Chevron Research Company, San Francisco, Calif.
Original application May 20, 1970, Ser. No. 39,116. Divided and this application Nov. 24, 1972, Ser. No. 309,299
Int. Cl. C01b 1/16, 2/06, 1/02
U.S. Cl. 423—655
2 Claims

ABSTRACT OF THE DISCLOSURE

A process for producing synthesis gas which comprises: (a) feeding an organic feed material, containing hydrogen and at least ten weight percent oxygen and containing less than five weight percent sulfur, to a reaction zone, (b) feeding steam to the reaction zone, and (c) contacting the steam with the organic feed material in the reaction zone at a temperature between about 800 and 1600° F. Preferably the feed material is solid waste material, most preferably solid municipal waste.

---

This is a division of application Ser. No. 39,116, filed May 20, 1970.

BACKGROUND OF THE INVENTION

The present invention relates to the production of synthesis gas and hydrogen. More particularly, the present invention relates to the production of synthesis gas and hydrogen-containing gases by the reaction of carbonaceous material with steam. The term "synthesis gas" is used herein to mean a gas comprising hydrogen and carbon oxides.

Synthesis gas can be used for a number of purposes, for example, the carbon oxides can be removed from the synthesis gas, usually after converting essentially all of the carbon monoxide to hydrogen and carbon dioxide, and the resulting purified hydrogen gas used in hydroconversion processes such as hydrocracking to produce jet fuel or gasoline. The synthesis gas can also be used to synthesize methanol from the hydrogen and carbon oxides or to synthesize other chemicals such as ammonia when nitrogen is added to the synthesis gas either after production of the synthestis gas or preferably during the reaction used to produce the synthesis gas. The synthesis gas can be used in a Fischer-Tropsch synthesis to form liquid hydrocarbons. Also, the synthesis gas can be used to form methane or it can be burned directly as a fuel gas or it can be combined with light hydrocarbons to form a fuel gas, usually after removal of at least part of the carbon oxides or a conversion of carbon monoxide to carbon dioxide.

Various methods have been suggested for the production of synthesis gas or hydrogen-rich gas mixtures. Among these methods are steam-hydrocarbon reforming, partial oxidation of hydrocarbons, Lurgi heavy hydrocarbons gasification, the traditional steam, red-hot coke reaction, and modified methods of reacting carbonaceous matter with steam and oxygen, such as described in U.S. Pat. 1,505,065.

The leading processes, that is, the two processes which are most frequently used to generate hydrogen, are steam-hydrocarbon reforming and partial oxidation of hydrocarbons.

In typical steam reforming processes, hydrocarbon feed is pretreated to remove sulfur compounds which are poisonous to the reforming catalyst. The desulfurized feed is mixed with steam and then is passed through tubes containing a nickel catalyst. While passing through the catalyst-filled tubes, most of the hydrocarbons react with steam to form hydrogen and carbon oxides. The tubes containing the catalyst are located in a reforming furnace, which furnace heats the reactants in the tubes to temperatures of 1200°–1700° F. Pressures maintained in the reforming furnace tubes range from atmospheric to 450 p.s.i.g. If a secondary reforming furnace or reactor is employed, pressures used for reforming may be as high as 450 p.s.i.g. to 700 p.s.i.g. In secondary reformer reactors, part of the hydrocarbons in the effluent from the primary reformer is burned with oxygen. Because of the added expense, secondary reformers are generally not used in pure hydrogen manufacture, but are used where it is desirable to obtain a mixture of $H_2$ and $N_2$, as in ammonia manufacture. The basic reactions in the steam reforming process are:

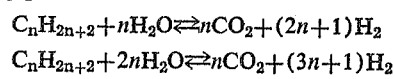

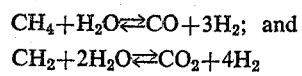

e.g., methane-steam:

$$CH_4 + H_2O \rightleftharpoons CO + 3H_2; \text{ and}$$

$$CH_2 + 2H_2O \rightleftharpoons CO_2 + 4H_2$$

In typical partial oxidation processes, a hydrocarbon is reacted with oxygen to yield hydrogen and carbon monoxide. Insufficient oxygen for complete combustion is used. The reaction may be carried out with gaseous hydrocarbons or liquid or solid hydrocarbons, for example, with methane, the reaction is:

$$CH_4 + \tfrac{1}{2}O_2 \rightleftharpoons 2H_2 + CO$$

With heavier hydrocarbons, the reaction may be represented as follows:

Both catalytic and noncatalytic partial oxidation processes are in use. Suitable operating conditions include temperatures from 2000° F. up to about 3200° F. and pressures up to about 1200 p.s.i.g., but generally pressures between 100 and 600 p.s.i.g. are used. Various specific partial oxidation processes are commercially available, such as the Shell Gasification Process, Fauser-Montecatini Process, and the Texaco Partial Oxidation Process.

There is substantial carbon monoxide in the hydrogen-rich gas generated by either reforming or partial oxidation. To convert the carbon monoxide to hydrogen and carbon dioxide, one or more CO shift conversion stages are typically employed. The CO shift conversion reaction is:

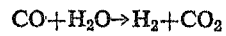

This reaction is typically effected by passing the carbon monoxide and $H_2O$ over a catalyst such as iron oxide activated with chromium.

Production of hydrogen and other gases from waste substances produced in the manufacture of paper from wood chips and the like has been discussed in the literature as, for example, in U.S. Pat. 3,317,292. In the manufacture of paper, wood chips are digested, for example, with an aqueous calcium sulfide liquid thereby forming calcium lignin sulfonate waste product in solution, leaving wood pulp behind. As disclosed in U.S. Pat. 3,317,292, the waste substances containing lignin-derived organic components can be converted to a gas mixture comprising hydrogen by contacting the waste material with steam in a reaction zone at an elevated temperature at least of the order of several hundred degrees centigrade. The sulfide waste liquor produced in the manufacture of paper from wood chips and the like is a relatively well-defined waste material consisting mostly of lignin-type organic compounds and certain inorganic components, incuding at least five weight percent sulfur calculated as the element sulfur but present usually in the form of sulfur compounds.

U.S. Pat. 3,471,275 discloses a method for converting refuse or garbage-type material to gases such as gases rich in hydrogen. According to the process disclosed in U.S. Pat. 3,471,275, the refuse is fed to a retort and heated therein to a temperature between about 1650° F. and 2200° F. The retort is externally heated. According to the '275 patent process, steam is not generally added to the retort. Any steam which is added to the retort according to the process disclosed in the '275 patent is added to the bottom of the retort so that steam would flow countercurrent to the waste material which is introduced to the retort at the top of the retort.

SUMMARY OF THE INVENTION

According to the present invention, a process is provided for producing synthesis gas which process comprises: (a) feeding an organic feed material, containing hydrogen and at least ten weight percent oxygen and containing less than five weight percent sulfur, to a reaction zone, (b) feeding steam to the reaction zone, and (c) contacting the steam with the organic feed material in the reaction zone at a temperature between about 800 and 1600° F.

We have found that the defined organic feed material is converted at an unexpectedly high rate to synthesis gas when the conversion is carried out in accordance with the present invention.

The reason for the fast reaction rate in the process of the present invention is not completely understood, but it is believed that an important factor is the oxygen content of the organic feed material in the process of the present invention. The organic feed material, which in this specification is to be understood to contain hydrogen, as well as carbon, must contain at least 10 weight percent oxygen which can be contrasted to the essentially nil amount of oxygen present in hydrocarbon feedstocks to synthesis gas-producing processes such as steam-light hydrocarbon reforming or hydrocarbon partial oxidation. The presence of oxygen in the organic feed material in the process of the present invention may contribute to the relatively fast reaction rate by making the feed material more susceptible to reaction with additional steam to produce hydrogen than in the case of hydrocarbon material containing little or no oxygen. We have found that it is particularly preferable in the process of the present invention to produce synthesis gas from organic feed material containing at least 25 weight percent oxygen and still more preferably, between about 35 and 70 weight percent oxygen.

We have also found that organic feed material containing the oxygen substantially in the form of polyhydroxylated compounds is particularly advantageous from the standpoint of high reaction rates with steam to form synthesis gas. Feeds containing oxygen in the form of polyhydroxylated compounds are meant to include carbohydrates such as cellulose and sugars.

The oxygen and the hydrogen content in the organic feed material are to be understood as chemically combined oxygen and hydrogen, i.e., oxygen and hydrogen which is connected through one or more chemical bonds to the carbon present in the organic feed material.

It is important in the process of the present invention that the feed material contain less than five weight percent sulfur. The sulfur is calculated as the element sulfur, although for those undesired and excluded feedstocks, the sulfur is usually present as a compound as, for example, an organic sulfur compound or an inorganic sulfur compound present in the feed material. Thus, it is to be understood that the organic feed material contacted with steam according to the process of the present invention is free from a high percentage of inorganic or organic sulfur compounds, i.e., that the feed contains less than five weight percent sulfur either as sulfur chemically combined with the organic feed material or as inorganic sulfur compounds physically mixed with the organic feed material. Feeds such as Kraft black liquor produced as a waste material in the manufacture of paper pulp are not suitable in the process of the present invention because of the relatively high content of sulfur compounds in the Kraft black liquor. It is undesirable to have substantial amounts of sulfur feed to the reaction zone in the process of the present invention because of the increased reactor cost and, more particularly, because of the increased problems in removing sulfur compounds from the synthesis gas produced in the reactor. It is preferred that the sulfur content of the organic feed material be below about three weight percent sulfur.

We have found that particularly suitable organic feed material for the process of the present invention includes solid waste material, including material commonly referred to as garbage. We have found that high reaction rates are obtained in the process of the present invention for the conversion of solid waste material to synthesis gas. The term "solid waste material" or "solid waste" is used herein to include solid municipal waste or common garbage, sewage, industrial waste such as sawdust, and agricultural waste such as corn husks and other discarded cellulosic material.

According to a particularly preferred embodiment of the present invention, the feed material is solid municipal waste including what is commonly referred to as garbage, but excluding sewage. This solid municipal waste, consisting primarily of common garbage, is particularly preferred in that we have found that with simulated solid municipal waste, high conversion rates to synthesis gas can be obtained in the process of the present invention and also sanitary valuable products are produced to alleviate an important disposal and pollution problem resulting from the increasing amounts of solid municipal waste which must be disposed of daily. In addition, we have determined that the amount of solid municipal waste for a number of urban areas is roughly satisfactory from a feed requirement standpoint for the production of synthesis gas to be used in various processes mentioned previously.

Typically, the solid municipal waste includes substantial amounts of at least proteins, fats, cellulose, sugars, starches and hydrocarbons. In this connection, "substantial amounts" is used to mean at least about one weight percent of the total solid municipal waste feed. Usually, the solid municipal waste feed will contain at least two weight percent of the above specified constituents.

The solid municipal waste feed which is used in the process of the present invention may contain a substantial amount of moisture. Thus, the term "solid" is used in distinction to free-running liquids and not to mean that the solid municipal waste material is free of moisture.

It should be understood that the feed composition for such a diverse feedstock as solid municipal waste will be subject to variation from time to time. Therefore, the composition of the solid municipal waste feed should be determined over a period of time as, for example, an average composition over a period of a day or a week's operation.

As indicated above, although solid wastes other than municipal wastes can be processed to form synthesis gas in accordance with the process of the present invention, it is particularly preferred to convert municipal waste to synthesis gas in accordance with the present invention as we have determined that the amount of municipal waste generated is particularly suited to the production of commercial amounts of hydrogen and that the municipal wastes are a surprisingly attractive feedstock in terms of synthesis gas yields.

One of the reactions occurring in the process of the present invention is the reaction of cellulosic material or sugar-type material with steam to produce hydrogen and carbon oxides. The cellulosic and sugar-type material can be considered on the basis of a simple sugar such as glucose for which the following reaction applies:

$$C_6H_{12}O_6 + 6H_2O \rightarrow 6CO_2 + 12H_2$$

Unlike a similar reaction where water is added to methane or carbon, the above reaction has a negative free energy change ($\Delta F$) at 25° C. so that, on the basis of thermodynamics, the reaction can occur at room temperatures. However, we have found that the reaction rate is very slow at room temperatures. Therefore, elevated temperatures are preferred in the reaction zone according to the process of the present invention. However, it is particularly preferred in the process of the present invention to use temperatures below 1600° F. Higher temperatures result in excessive heat requirements, increased reactor cost and also lower yields of hydrogen. Thus, preferably, the contacting of the organic feed material with the steam is carried out in a reaction zone at a temperature between about 500 and 1600° F. and more preferably, between about 700 and 1600° F. Temperatures between 800 and about 1200 or 1400° F. are particularly preferred. At these temperatures, we have found that the reaction of the organic feed material with steam is a surprisingly attractive route to produce hydrogen-rich gas, with relatively high $H_2$ yields and relatively low heat requirements.

The process of the present invention can be carried out over a wide range of pressures from about one atmosphere to 200 atmospheres. According to a particularly preferred embodiment of the present invention, the pressure in the reaction zone is maintained between about 30 and 150 atmospheres. We have found that these high pressures are particularly advantageous in the reaction of solid waste material with steam while the reaction zone is maintained at a temperature between about 500 and 1600° F. Because the reaction of solid waste material with steam has been found to be fairly rapid compared, for example, to the reaction of coke or carbon with steam, a substantial rate of production of hydrogen from solid waste material can be obtained at relatively high pressures including pressures ranging from about 500 or 1000 p.s.i.g. up to about 2000 or 3000 p.s.i.g. The relatively low temperatures required in the process of the present invention, i.e., temperatures below 1600° F. and more preferably below 1400° F. are important in the preferred embodiment of the present invention wherein high pressures are used in the reaction zone. The lower temperatures result in considerable savings in the cost of the reactor, particularly at the preferred high reaction pressures. High reaction pressures afford the extremely important advantage of generating synthesis gas at a high pressure so that the synthesis gas needs little or no compression before being used in a high pressure hydroconversion process such as hydrocracking or hydrotreating. Also, $CO_2$ is more economically removed from raw hydrogen generated at the preferred high pressures in accordance with the present invention because the high pressure $CO_2$ can be removed from the hydrogen by absorbing the $CO_2$ into a physical absorbent such as methanol or propylene carbonate as opposed to the more expensive means of removing $CO_2$ at low pressure using a chemical absorbent such as an amine.

In the process of the present invention, it is preferred to add an oxygen-containing gas such as air or molecular oxygen to the reaction zone to burn a portion of the organic feed material with steam to form synthesis gas and carbon oxides. The heat for the reaction can also be supplied by heating the steam fed to the reaction zone to a sufficiently high temperature to supply the required amount of heat for the endothermic reaction of steam plus organic material to form synthesis gas.

In accordance with an important preferred embodiment of the present invention, the flow of organic feed material and steam feed to the reaction zone is concurrent within the reaction zone. Thus, it is preferred to feed both the organic feed material and the steam to the top or upper part of the reactor and to allow or provide for basically downward flow of the organic feed material and reactant steam in the reactor, and to withdraw produced hydrogen-rich gases from the lower part of the reactor. Operation in accordance with this preferred embodiment results in less oily material and unconverted hydrocarbons being withdrawn from the reaction zone. Also, the temperature in the reaction zone can be controlled at the relatively low levels preferred in accordance with the process of the present invention so as to further maximize the yield of synthesis gas in the reaction zone.

The conversion of organic feed material, particularly solid wastes, to synthesis gas in accordance with the present invention, operates as a hertofore unharnessed use of the sun's energy. The sun puts a great deal of radiant (as opposed to thermal) energy into the constituents that make up organic feed materials such as solid wastes, but in the past, the energy of solid waste has generally not been utilized in the United States and instead, solid waste has mostly been a nuisance and sanitation problem. Living plants manufacture carbohydrates from carbon dioxide and water in the presence of sunlight and chlorophyll by means of a complex series of reactions, (heat and nutrients in the soil are also needed). Radiant energy is an important factor in the transformation. The transformation process is commonly known as photosynthesis. The carbohydrates produced by the photosynthetic process in plants can be represented by the general formula $C_a(HOH)_b$. Using the general formula of a carbohydrate, an abbreviated chemical equation to represent photosynthesis can be written as follows:

$$aCO_2 + bHOH \xrightarrow{h\nu} C_a(HOH)_b + aO_2$$

The photosynthesis of a specific carbohydrate, glucose, may be represented by the equation:

$$6CO_2 + 6HOH \longrightarrow C_6H_{12}O_6 + 6O_2 - 671 \text{ kca}$$

As is indicated by the —671 kilocalories after the above equation, radiant energy received from the sun is stored in carbohydrates such as the simple glucose carbohydrate in the above equation.

In the process of the present invention, clean hydrogen which has a high amount of "stored" energy is produced from garbage-type feed material including carbohydrates. Thus, it may be noted that if the hydrogen produced in accordance with the present invention is burned with oxygen, there is a release of about 52,200 B.t.u.'s per pound of hydrogen. The hydrogen is obtained from a carbohydrate (for example) by reaction of the carbohydrate with $H_2O$ requiring a heat input of about 6,600 B.t.u.'s per pound of hydrogen produced. The other 45,600 B.t.u.'s per pound of hydrogen is put in by photosynthesis. Thus, about 87 percent of the stored energy in the hydrogen produced in the present invention comes from the sun— the process of the present invention adds only another approximately 13 percent of the hydrogen's stored heat energy.

A particularly preferred overall process embodiment for producing high pressure hydrogen for use, for example, in a hydroconversion process such as hydrocracking comprises the following steps: (a) reacting the organic feed material with steam in a reaction zone at a temperature between 500 and 1600° F. to generate a hydrogen-rich gas containing hydrogen, hydrogen sulfide, carbon monoxide, and carbon dioxide, (b) withdrawing the hydrogen-rich gas from the reaction zone at a temperature between 500 and 1600° F., (c) recovering heat from the hydrogen-rich gas by heat exchanging the hydrogen-rich gas with $H_2O$ to obtain steam, (d) using at least a portion of the steam generated in step (c) as feed steam for reaction with the organic feed material according to step (a), (e) separting $H_2S$ from hydrogen-rich gas withdrawn from heat recovery step (c), (f) shift converting carbon monoxide present in hydrogen-rich gas withdrawn from the $H_2S$ separation step to obtain additional hydrogen gas, and (h) separating carbon dioxide from the high pressure hydrogen-rich gas by physical absorption of carbon dioxide present in the high pressure hydrogen gas.

BRIEF DESCRIPTION OF THE DRAWING

The drawing is a process flow diagram schematically indicating preferred embodiments of the present invention.

DETAILED DESCRIPTION OF THE DRAWING

Referring now more particularly to the drawing, organic material is fed as indicated by arrow 1 to the process as is schematically indicated in the drawing. According to one preferred embodiment of the present invention, the organic feed material is ordinary municipal solid wastes or garbage. Preferably, certain constituents such as metals and, in particular, iron-containing material, is removed from the solid wastes prior to reacting the solid wastes with steam. The constituents which make up the solid wastes generally include clothing, food particles and food peels, plastics, paper, cardboard, wood, etc. The process of the present invention is preferably applied to ordinary municipal or city garbage.

Referring again to the drawing, a conveyor belt, as indicated in the drawing by numeral 2, can be used to transport the organic feed material so that it falls as indicated by arrow 3 into a hopper 4 for feeding to reactor 6 via line 5. In reactor 6, the organic feed material is contacted with steam introduced via line 7 or via line 7a. The steam and organic feed material react to form synthesis gas (hydrogen and carbon oxides) and usually minor amounts of various other gases such as hydrogen sulfide.

As indicated previously, the reaction of the organic feed material with steam to form hydrogen is basically an endothermic reaction. Therefore, heat must be supplied to the reaction zone. In accordance with a preferred embodiment of the present invention, heat is obtained by burning a portion of the garbage with oxygen introduced to the reaction zone via line 8. In the case of hydrogen production for ammonia synthesis, it is preferred to use air as the source of oxygen to the reaction zone so that a mixture of nitrogen and hydrogen can be produced for ammonia synthesis. When relatively pure hydrogen is required, then it is preferred to use molecular or purified oxygen as the oxygen source. Heat can be supplied to reaction zone 6 by other means as, for example, direct input of heat to the reaction zone by means of heating coils or hot tubes. Also, the overall heat balance may be made by heating the steam to the reaction zone to a high temperature substantially above the temperature to which the steam can be heated by simply recovering heat present in the effluent from the reaction zone.

According to a particularly preferred embodiment of the process of the present invention, the temperature in the reactor, i.e., in reactor 6, is controlled by burning a portion of and recycling a relatively large amount of the synthesis gas effluent from heat recovery zone 12 back to the reactor. Particularly, it is preferred to recycle about 15–50 parts by weight of effluent synthesis gas back to the reactor compared to the parts by weight oxygen used for combustion. Preferably, the oxygen is burned with a small portion of the recycle synthesis gas in a combustion chamber to obtain a temperature in the order of about 1500 to 1900° F. in the combustion chamber and the heated recycle synthesis gas effluent is then introduced to reactor 6 to obtain a temperature between about 700 and 1600° F. and preferably about 1200–1400° F. in the reactor.

This particularly preferred embodiment of the present invention can be briefly illustrated by an approximate quantitative example. About 3,700 tons per day of solid municipal waste is fed to a reactor operated at a temperature of about 1200° F. The 3,700 tons per day of solid municipal waste feed is reacted with steam in the reactor or reactors to produce a net product synthesis gas of about 100 million standard cubic feet per day of $H_2$ plus CO. Both the solid municipal waste and the steam or water are fed to the upper part of the reactor and the gross effluent gas is removed from the lower part of the reactor. After separating fly ash from the gross product gas in a cyclone separator, the gross effluent gas is cooled by giving up a large portion of its heat content to boiler feed water to generate steam in heat recovery zone 12. A major portion of the gross effluent gas from the reactor is passed via line 27 to combustion chamber 28 wherein it is burned with approximately 500 tons per day of oxygen. About 250 million B.t.u.'s per hour are produced by the burning of the recycle gases introduced via line 27 to combustion chamber 28. The hot gases leave the combustion chamber at a temperature of about 1800° F. via line 29. These hot gases are then introduced via lines 30, 31 and 32 to reactor 6 in order to supply the heat to achieve and maintain a reaction temperature of about 1200° F. in reactor 6. The ratio of recycle gas passed via line 27 to oxygen added via line 8 to the combustion chamber is between about 15 and 50 on a weight basis. Preferably, the weight ratio of recycle gas to oxygen is between about 20 and 40 on a weight basis.

The net product of 100 million standard cubic feet per day of $H_2$ plus CO is passed via line 15 to gas purification zone 16 for $H_2S$ removal. In those instances where a synthesis gas comprising $H_2$ and CO is desired, the synthesis gas may be withdrawn from the process after gas purification zone 16. In those instances where purified hydrogen is desired, the $H_2$ and $H_2$ plus CO is passed to CO shift conversion zone 20 and then to gas purification zone 22 so that a purified hydrogen stream can be withdrawn via line 24.

As indicated in the drawing, the sanitary residue remaining from the organic feed material can be removed from the lower part of the reaction zone after it has fallen through a grating, as indicated by numeral 9. Mechanical apparatus and means used for the reaction of carbonaceous material such as coal and similar material can be adapted to the process of the present invention wherein material such as solid wastes are reacted with steam and a sanitary residue or ash remains. Thus, it is apparent that various mechanical schemes can be used for the reactor in the process of the present invention.

Preferably, the reaction is carried out at a temperature within the range of about 700 to 1600° F. and temperatures in the range of about 800 to 1400° F. have been found to be particularly attractive in terms of high synthesis gas yield. Usually, there will be a temperature gradient in the reactor with a somewhat higher temperature prevailing in the lower part of the reactor. The upper part of the reactor typically is cooled somewhat relative to the lower part of the reactor because the solid waste material is being heated in this zone. In any event, the gases removed from the reactor via line 11 are still at an elevated temperature, usually in the range of about 1000° F. These hydrogen-rich hot gases are passed via line 11 to heat recovery zone 12.

This process can be carried out at pressures of one atmosphere to 150 atmospheres, but preferable pressures are 4–20 atmospheres. The reaction of solid waste material with steam to form synthesis gas is far more thermodynamically favorable than a similar reaction for either $CH_4$, C, coke, coal, or hydrocarbons. Therefore, it is possible to carry this reaction out at much greater pressures than are used with the other feedstocks. Thus, particularly preferred reaction pressures are between about 30 and 150 atmospheres. These high pressures minimize or eliminate the need for subsequent compression of the hydrogen gas produced as, for example, when the hydrogen gas is to be used in a high pressure hydroconversion process.

The steam for the process of the present invention can be generated in various manners, but it is preferred to recover heat present in the effluent gases from reaction zone 6 by heat exchange of the hot effluent gases from reactor 6 with water in heat recovery zone 12 to thereby generate steam removed via line 14 from heat recovery zone 12. If necessary, additional heat may be put into the steam in line 14 or line 7 before it is passed via line 7 to reactor 6.

In the process of the present invention, it is preferred to utilize a portion of the steam generated in heat recovery zone 12 in CO shift conversion zone 20, as is indicated by the steam passed via line 19.

In heat recovery zone 12, $H_2O$ and oily material withdrawn in the gaseous or vapor stream via line 11 or 11a from reactor 6 is condensed. The condensed $H_2O$ will typically contain various gases produced in reactor 6 such as HCl, HBr, HI, $NH_3$, HF, etc., as well as some $CO_2$, CO and $H_2S$. The oily phase of the liquid condensed out of the hydrogen-rich gas withdrawn from reactor 6 will typically contain hydrocarbons and oxygenated hydrocarbon components such as methanol, acetic acid, formaldehyde, formic acid, acetone, etc., will be partitioned between the two phases.

The condensed aqueous phase and oily phase are shown as schematically withdrawn from the process via line 27. The materials withdrawn via line 27 can be passed to various further processing as, for example, processing for the recovery of oil and the separation of various chemicals.

In accordance with a particularly preferred embodiment of the process of the present invention, the flow of steam and solid waste material in reactor 6 is essentially concurrent as opposed to countercurrent flow. Thus, the solid waste material is introduced to reactor 6 via line 5 and according to this preferred embodiment, steam is introduced to reactor 6 at the top of reactor 6 via line 7a. The upper part of the reactor will be cooler than the lower part of the reactor in most instances because of the relatively low temperature of the solid waste material introduced to the reactor. However, after a portion of the solid waste material has been reacted with oxygen to supply heat, the temperature will rise. Thus, the lower part of the reactor will be at a higher temperature than the upper part of the reactor. According to this preferred embodiment of the present invention, the raw hydrogen-rich gas is withdrawn from reactor 6 in the lower part of the reactor via line 11a. Operation in accordance with this preferred embodiment affords the advantage of reducing the amount of oily substances withdrawn from reactor 6 by converting these oily substances to synthesis gas or by burning the oily substances in reactor 6. In counterflow operation of reactor 6, steam introduced at the lower part of the reactor tends to strip or retort a certain amount of oil out of the solid waste feed to the upper part of reactor 6. In concurrent flow of the solid waste material and steam, this stripping or retorting is substantially reduced and the raw hydrogen gas is withdrawn from a relatively hot zone of the reactor so that oily material obtained from the solid waste material will be substantially reduced by reaction with steam to form synthesis gas and/or by oxidation with oxygen to yield heat.

Valves 25 and 26 are closed when it is desired to operate reactor 6 with concurrent flow of solid waste material and steam.

The gas withdrawn via line 11 or 11a is the basic synthesis gas produced in accordance with the present invention. Zones 12, 16, 20 and 22 relate to further treatment of this synthesis gas which is particularly preferred in the production of a relatively pure hydrogen stream and it is to be understood that these subsequent steps can be altered when other final products are desired as, for example, in the case of methanol production.

According to the preferred overall process embodiment shown in the drawing, the cooled gases from heat recovery zone 12 are passed via line 15 to gas purification zone 16. Usually, one or more additional cooling steps will be applied to the gases removed from zone 20 before they are purified in gas purification zone 16.

In gas purification zone 16, $H_2S$ which may be present in the effluent from reactor 6 is removed, preferably by scrubbing the hydrogen-rich gas with an $H_2S$ absorbent. Various gas purification means may be employed in gas purification zone 16. The use of mono-ethanol amine (MEA) is a preferred absorbent for removing $H_2S$ and other sulfur compounds. A portion of the carbon dioxide present in the gases from reactor 6 are generally removed from the hydrogen-rich gas at the same time $H_2S$ is removed from the hydrogen-rich gas, but it is preferred not to remove carbon monoxide from the hydrogen-rich gas in gas purification zone 16. $H_2S$ present in the hydrogen-rich gas produced in reactor 6 and removed from the hydrogen in gas purification zone 16 can be passed to other processing. For example, the $H_2S$ can be passed via line 17 from gas purification zone 16 to a Claus process for the production of sulfur. Usually, the $H_2S$ will contain some carbon dioxide, but preferably only small amounts of carbon monoxide.

After at least $H_2S$ removal from the hydrogen-rich gas in gas purification zone 16, the hydrogen-rich gas is fed via line 18 to CO shift conversion zone 20. In the CO shift conversion zone, CO present in the hydrogen-rich gas is reacted with steam added to the CO shift conversion zone to form $CO_2$ and additional hydrogen.

Hydrogen-rich gas containing only small amounts of CO, for example, between about .2 and 2.0 volume percent CO, is withdrawn from CO shift conversion zone 20 via line 21. The hydrogen-rich gas from CO shift conversion can be directly passed to the gas purification zone 22 for removal of $CO_2$ using an absorbent which is selective for $CO_2$ as opposed to hydrogen, such as mono-ethanol amine.

However, it is preferred to centrifugally compress the hydrogen-carbon dioxide gas mixture from the CO shift conversion zone prior to removing the $CO_2$. It is particularly preferred to centifugally compress the $H_2$-$CO_2$ gas and then remove $CO_2$ by physical absorption using a solvent such as propylene carbonate or methanol. The use of centrifugal compressors for hydrogen-carbon dioxide compression is discussed in more detail in commonly assigned patent applications Ser. No. 736,520, filed May 17, 1968, now U.S. 3,618,331, Ser. No. 788,299, filed Dec. 31, 1968, now U.S. 3,551,106, and Ser. No. 788,262, filed Dec. 31, 1968, now U.S. 3,532,467. The disclosures of these applications, particularly those portions relating to hydrogen-carbon dioxide centrifugal compression and also the disclosure relating to CO shift conversion and hydrogen gas purification are incorporated by reference into the present patent application.

In accordance with that preferred overall process embodiment of the present invention wherein the hydrogen-carbon dioxide gas from shift conversion is centrifugally compressed and then treated for $CO_2$ removal with a physical absorbent, the hydrogen withdrawn via line 24 from gas purification zone 22 usually will be at sufficiently high pressure as, for example, 1000 to 2500 p.s.i.g., for use of the hydrogen in a high pressure hydroconversion process such as catalytic hydrocracking. In other instances, for example when the hydrogen produced in the process of the present invention is to be used as a fuel gas blending component, little or no compression of the hydrogen gas produced in reactor 6 is usually necessary because reactor 6 is preferably operated at a pressure between about 4 and 20 atmospheres.

EXAMPLE

Fifty grams of organic feed material was charged to a one-liter quartz reactor. The organic feed material used in this instance was simulated solid municipal waste composed of 50 weight percent paper, 10 weight percent sawdust, 3 weight percent wool, 2 weight percent plastic, 10 weight percent cotton, 10 weight percent iron, 2 weight percent aluminum, and 13 weight percent food peels such as orange peels, etc. The oxygen content of this particular organic feed material was approximately 50 percent by weight excluding the metallic materials, i.e., iron and aluminum in the reactor charge.

Fifty-three milliliters of $H_2O$ was added to the quartz reactor over a four-hour period. The internal reaction zone in the reactor was maintained at a temperature of about 1200 to 1400° F. during most of the reaction time. No catalyst was used in this laboratory run.

Over the four-hour period, the total gas production was approximately 22 liters. The maximum gas production rate during the four-hour run period was about 10 liters per hour. The gas produced contained about 60 volume percent hydrogen with the remainder being mostly $CO_2$ and CO.

Recovered from the 50 grams charge to the reactor was 11.8 grams of residue. Of this residue, 6.3 grams were iron and aluminum and their oxides. The carbon, hydrogen, oxygen elemental analysis of the organic residue was about 85 weight percent C, about 1.4 weight percent H, and about 14 weight percent O.

The above results illustrate that organic feed material, particularly solid municipal waste-type material, can be converted to substantial amounts of synthesis gas with the simultaneous production of a residue which is sanitary because of the high temperature treatment of the solid municipal waste and the breaking down of the solid municipal waste into various constituents. The results also illustate that the synthesis gas can be produced at a fairly high rate at relatively low temperatures; the rate of synthesis gas production from the solid municipal waste was surprisingly found to be considerably higher than the rate of hydrogen production from carbon by reacting carbon with $H_2O$ under similar temperature conditions.

Although various embodiments of the invention have been described, it is to be understood that they are meant to be illustrative only and not limiting. Certain features may be changed without departing from the spirit or scope of the invention. The process of the present invention can be carried out in the absence of catalysts or in the presence of a catalyst. Particularly preferred catalysts are disclosed in my application titled Catalytic Hydrogen Manufacture, Ser. No. 34,834 filed May 5, 1970, now U.S. 3,759,677. It is apparent that the present invention has broad application to the production of gases comprising hydrogen from certain organic feed material by reaction of the organic feed material with steam. Accordingly, the invention is not to be construed as limited to the specific embodiments or examples discussed but only as defined in the appended claims.

I claim:
1. A process for converting to a hydrogen-rich gas and a sanetaoin
1. A process for converting solid organic waste containing less than five weight percent sulfur to a hydrogen-rich gas and a sanitary inorganic containing residue and for separating gases obtained during the conversion of said solid waste into valuable gas streams which comprises:
  (a) reacting the solid waste with steam in a reaction zone at a temperature between 500 and 1600° F. to generate a hydrogen-rich gas containing hydrogen, hydrogen sulfide, carbon monoxide, and carbon dioxide,
  (b) withdrawing the hydrogen-rich gas from the reaction zone at a temperature between 500 and 1600° F.,
  (c) recovering heat from the hydrogen-rich gas by heat exchanging the hydrogen-rich gas with $H_2O$ to obtain steam,
  (d) using at least a portion of the steam generated in step (c) as feed steam for reaction with the solid waste according to step (a),
  (e) separating $H_2S$ from hydrogen-rich gas withdrawn from heat recovery step (c),
  (f) shift converting carbon monoxide present in hydrogen-rich gas withdrawn from the $H_2S$ separation step to obtain additional hydrogen and carbon dioxide, and
  (g) separating carbon dioxide from the hydrogen-rich gas withdrawn from the carbon monoxide shift conversion step.

2. A process for converting solid organic waste containing less than five weight percent sulfur to a hydrogen-rich gas and a sanitary inorganic containing residue and for separating gases obtained during the conversion of the said solid waste into valuable gas streams which comprises:
  (a) reacting the solid waste with steam in a reaction zone at a temperature between 500 and 1600° F. to generate a hydrogen-rich gas containing hydrogen, hydrogen sulfide, carbon monoxide, and carbon dioxide,
  (b) withdrawing the hydrogen-rich gas from the reaction zone at a temperature between 500 and 1600° F.,
  (c) recovering heat from the hydrogen-rich gas by heat exchanging the hydrogen-rich gas with $H_2O$ to obtain steam,
  (d) using at least a portion of the steam generated in step (c) as feed steam for reaction with the solid waste according to step (a),
  (e) separating $H_2S$ from hydrogen-rich gas withdrawn from heat recovery step (c),
  (f) shift converting carbon monoxide present in hydrogen-rich gas withdrawn from the $H_2S$ separation step to obtain additional hydrogen and carbon dioxide,
  (g) centrifugally compressing hydrogen-carbon dioxide gas withdrawn from step (f) to obtain a high pressure hydrogen gas, and
  (h) separating carbon dioxide from the high pressure hydrogen-rich gas by physical absorption of carbon dioxide present in the high pressure hydrogen gas.

References Cited
UNITED STATES PATENTS

| | | | |
|---|---|---|---|
| 2,183,301 | 12/1939 | Bossner et al. | 423—655 |
| 2,934,407 | 4/1960 | Simonek et al. | 423—655 |
| 3,317,292 | 5/1967 | Juda | 48—209 |
| 3,413,214 | 11/1968 | Galbreath | 423—655 X |
| 3,471,275 | 10/1969 | Borggreen | 48—209 |
| 3,511,194 | 3/1970 | Stookey | 48—209 UX |
| 3,576,603 | 4/1971 | Smith et al. | 423—655 |
| 3,618,331 | 11/1971 | Smith et al. | 62—23 |

EDWARD STERN, Primary Examiner

U.S. Cl. X.R.

252—373; 423—648, 650